United States Patent [19]

Benoist et al.

[11] Patent Number: 4,730,453

[45] Date of Patent: Mar. 15, 1988

[54] AFTERBURNER FUEL INJECTION SYSTEM

[75] Inventors: René A. Benoist; Guy J. Lapergue, both of Le Mee sur Seine; Jacques A. Legueux, Voisenon, all of France

[73] Assignee: Societe Nationale d'Etude et de Construction de Moteurs d'Aviation "S.N.E.C.M.A.", Paris, France

[21] Appl. No.: 920,435

[22] Filed: Oct. 20, 1986

[30] Foreign Application Priority Data

Oct. 23, 1985 [FR] France ................................ 85 15713

[51] Int. Cl.[4] ............................ F02K 7/10; F02C 7/22

[52] U.S. Cl. .......................................... 60/261; 60/737

[58] Field of Search ...................... 60/39.094, 737, 738, 60/739, 740, 261

[56] References Cited

U.S. PATENT DOCUMENTS

| | | | |
|---|---|---|---|
| 2,705,869 | 4/1955 | Johnstone | 60/738 |
| 2,963,857 | 12/1960 | Egbert et al. | 60/261 |
| 2,967,394 | 1/1961 | Jensen | 60/737 |
| 3,044,264 | 7/1962 | Seaward et al. | 60/261 |
| 3,344,602 | 10/1967 | Davies et al. | 60/39.094 |
| 3,698,186 | 10/1972 | Beane et al. | 60/261 |
| 4,257,235 | 3/1981 | Morishita et al. | 60/737 |

FOREIGN PATENT DOCUMENTS

| | | | |
|---|---|---|---|
| 1133185 | 7/1962 | Fed. Rep. of Germany . | |
| 1230868 | 9/1960 | France . | |
| 1321385 | 5/1961 | France . | |
| 1454312 | 9/1966 | France . | |
| 7025907 | 3/1972 | France . | |
| 2018971 | 4/1913 | United Kingdom . | |
| 587083 | 4/1947 | United Kingdom . | |
| 650608 | 2/1951 | United Kingdom | 60/738 |

*Primary Examiner*—Louis J. Casaregola
*Attorney, Agent, or Firm*—Bacon & Thomas

[57] ABSTRACT

An afterburner fuel injection system is disclosed which utilizes a plurality of individual fuel injectors displayed in a radial array around the periphery of a turbojet afterburner. An atomizing chamber is associated with each fuel injection conduit to achieve a homogeneous atomization of the fuel with the exhaust gases passing through the afterburner. Each fuel injector is individually connected to a fuel supply source and a source of purging air to minimize the delay in afterburner ignition and to prevent coking of the injector nozzles.

8 Claims, 7 Drawing Figures

AFTERBURNER FUEL INJECTION SYSTEM

BACKGROUND OF THE INVENTION

The present invention relates to a fuel injection system for an afterburner of a turbojet engine. Afterburners, of course, are well known and typically comprise a passage located downstream of the turbine of the turbojet engine through which pass the exhaust gases from the engine. In order to provide additional thrust to the turbojet engine, fuel is injected into this exhaust gas stream and ignited.

It is also known to provide individual fuel injectors extending in a generally radial direction into the afterburner. These injectors typically comprise plain tubes with their radially innermost ends sealed and the sidewalls perforated to define orifices through which the fuel issues. The orifices, as exemplified in British Patent No. 587,083, face in an upstream direction into the direction of flow of the exhaust gases. The injection of pressurized fuel into the exhaust gas stream through such a very small diameter orifice results in a highly localized fuel jet which requires an anvil located upstream of the opening to cause the fuel to splatter or disperse so as to render the fuel mixture as uniform as possible.

Such fuel injectors, however, do not provide a long operational life due to the clogging of the fuel orifices due to coking of the fuel, especially when the afterburner is passing from the non-operational to the operational mode. Another drawback of the injectors is that they provide a highly heterogeneous atomization of the fuel mixture along the periphery of the exhaust gas stream, thereby creating zones of different temperatures downstream of the injector. These zones cause improper operation of the afterburner and should be avoided if at all possible.

The afterburner shown in the aforementioned British patent utilizes an annular, perforated grille as the anvil or splatterer. The use of this structure causes large wakes in the exhaust gas stream that contributes to the heterogeneity of the fuel/gas mixture.

A second type of after burner injector is described in U.S. Pat. No. 3,044,264 to Seaward et al which utilizes a swirl jet generated by means of a fuel injection nozzle from which the fuel is injected tangentially into the exhaust gas stream. This device also suffers from poor atomization, excessive heterogeneity of the fuel/gas mixture downstream of the injection device and coking of the fuel injection nozzle orifice.

A third type, as disclosed in French Patent No. 1,454,312, utilizes a combination of pressurized fuel injectors and catalytic ignitors with a mixture of compressed air from the turbine to create a homogeneous mixture. This design requires the presence of two types of components, namely injectors and ignitors, in the gas stream thus requiring the afterburner to be more complex and inherently costlier to manufacturer and to maintain.

In an attempt to overcome the drawbacks of the aforementioned prior art devices, afterburner systems having circular fuel-injection manifolds associated with burner rings have been utilized with some success. These systems, as illustrated in French Patent No. 2,097,587, satisfactorily provide a homogeneous fuel/gas mixture. However, the devices present a substantial obstacle in the gas flow stream and generate substantially large wakes which deleteriously affect the turbojet engine operation when the afterburner is inoperative. The circular fuel injection manifolds typically have only a single fuel intake line, or at the most two such intakes, such that the response time for the initiation of the afterburner is increased due to the time required for the fuel to pass through the length of the manifold.

In addition to the aforementioned difficulties posed by the afterburner function, more recent turbojet engines operate at a substantially higher temperatures in the exhaust gas flow due to the improved design of the combustion chambers and to the use of ceramics, composites, or the like for the turbine wheels and blades. These increased operating temperatures have led to afterburner systems having several, concentric fuel injection manifolds. This, quite obviously, increases the complexity of the afterburner fuel injection system and typically requires a complex suspension system for the manifolds. The fuel intake tube must be cushioned relative to the wall of the gas passage, which may result in leakages at the wall where the intake tube passes through it. These multiple fuel injection manifolds further increase the time for the fuel to pass completely through them, thereby compounding the coking problems when changing the operational mode of the afterburner. This problem has only been incompletely remedied by a purge box which may be associated with the intake tube.

SUMMARY OF THE INVENTION

An object of the present invention is to provide a fuel injection system for an afterburner which eliminates the aforementioned problems, especially in modern turbojet engines having higher exhaust gas temperatures.

Another object of the invention is to provide such a fuel injection system having the shortest possible response time. Also, the system according to this invention provides a fuel injection system having very little susceptibility to coking, and, hence, has reduced maintenance. Maintenance costs are further reduced by the ease with which the system may be assembled and disassembled.

The fuel injection system provides at least one fuel injecting device extending into the exhaust gas stream in association with a fuel suppy circuit and a flame holder. A plurality of fuel injector tubes are regularly distributed about the periphery of the wall defining the afterburner passage such that each extends in a generally radial direction and is oriented generally perpendicular to the flow of the exhaust gases. Each of the individual fuel injector tubes is individually connected to a pressurized fuel supply circuit such that each is supplied independently of the others. A fuel atomizing chamber is associated with each individual fuel injector, the chamber defining at least one intake orifice to allow exhaust gas to pass into the chamber and at least one exit orifice to allow the atomized fuel/gas mixture to pass from the atomizing chamber. A passage or nozzle is defined by the fuel injector tube so as to spray fuel into the atomizing chamber associated with each fuel injector.

In one embodiment of the invention, a calibrated nozzle sprays fuel into the associated atomizing chamber. A wall of the chamber located opposite the calibrated nozzle defines a generally spherical concave depression upon which the fuel emanating from the nozzle impinges so as to assist in its atomization. Further atomization is provided by contact with the partially atomized fuel with the exhaust gases passing through the intake orifice of the atomizing chamber. The atomized fuel/gas mixture then passes through at least one exit orifice in a downstream direction. The atomizing chamber may be attached to the radially innermost end of the tubular fuel injector, which end is constricted so as to form the calibrated fuel outlet nozzle.

In a second embodiment, the atomization chamber is defined by a cylindrical sleeve concentrically disposed about the portion of the fuel injection tube extending into the afterburner passage. The ends of the cylindrical tube are closed and the sidewall defines an upstream facing gas intake orifice and at least one downstream facing exit orifice. The axes of the intake and exit orifices are parallel to each other and also parallel to the direction of flow of the exhaust gas. The radially innermost end of the fuel injector tube is also closed and the sidewall of the tube defines at least two nozzles allowing fuel to communicate between the fuel injector and the atomizing chamber. The axis of the nozzles are generally perpendicular to a plane containing the axes of the intake and exit orifices.

DETAILED DESCRIPTION OF THE PREFERRED EMBODIMENTS

Figure 1:
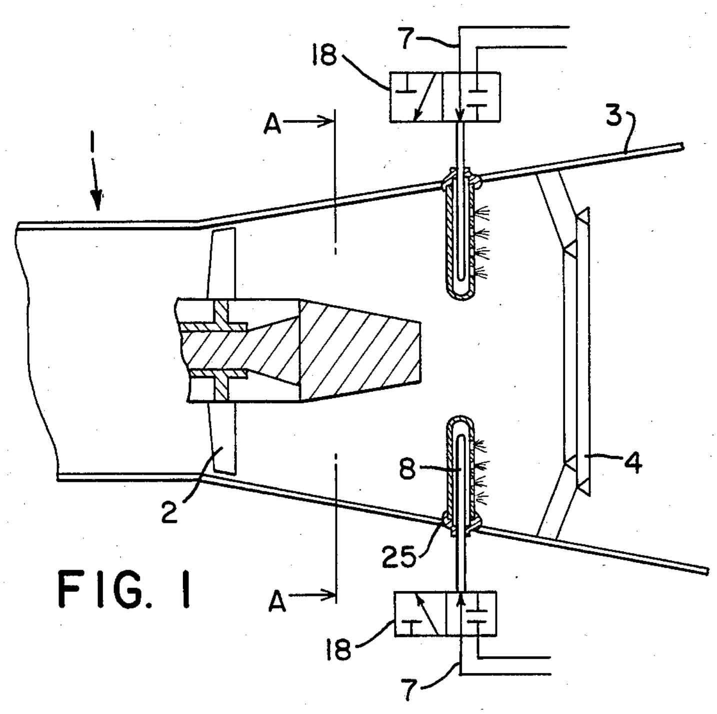
FIG. 1 is a partial, longitudinal sectional schematic view of a turbojet engine having an afterburner with the fuel injection system according to the invention.

FIG. 1 schematically shows a rear portion of a turbojet engine 1 having at least one turbine wheel 2 and an afterburner passage defined by exhaust pipe wall 3. Flame holders 4, which may be of known construction, are located within the afterburner downstream of the fuel injection system which injects fuel into the afterburner chamber. As is well known in the art, exhaust gases from the combustion chambers of the turbojet engine 1 pass from left to right, as seen in FIG. 1, so as to drive the turbine wheel 2 before passing through the afterburner. A plurality of fuel injectors 8 are arranged in a radial array so as to extend into the afterburner chamber. The injectors are regularly distributed fashion about the periphery of the afterburner.

Figure 3:
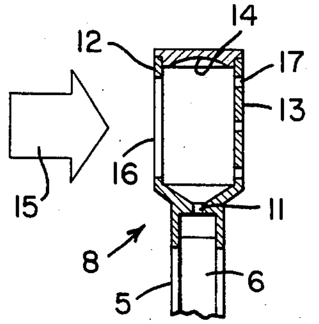
FIG. 3 is a partial, cross-sectional view of a fuel injector and an atomizing chamber according to a first embodiment of the invention.
Figure 7:
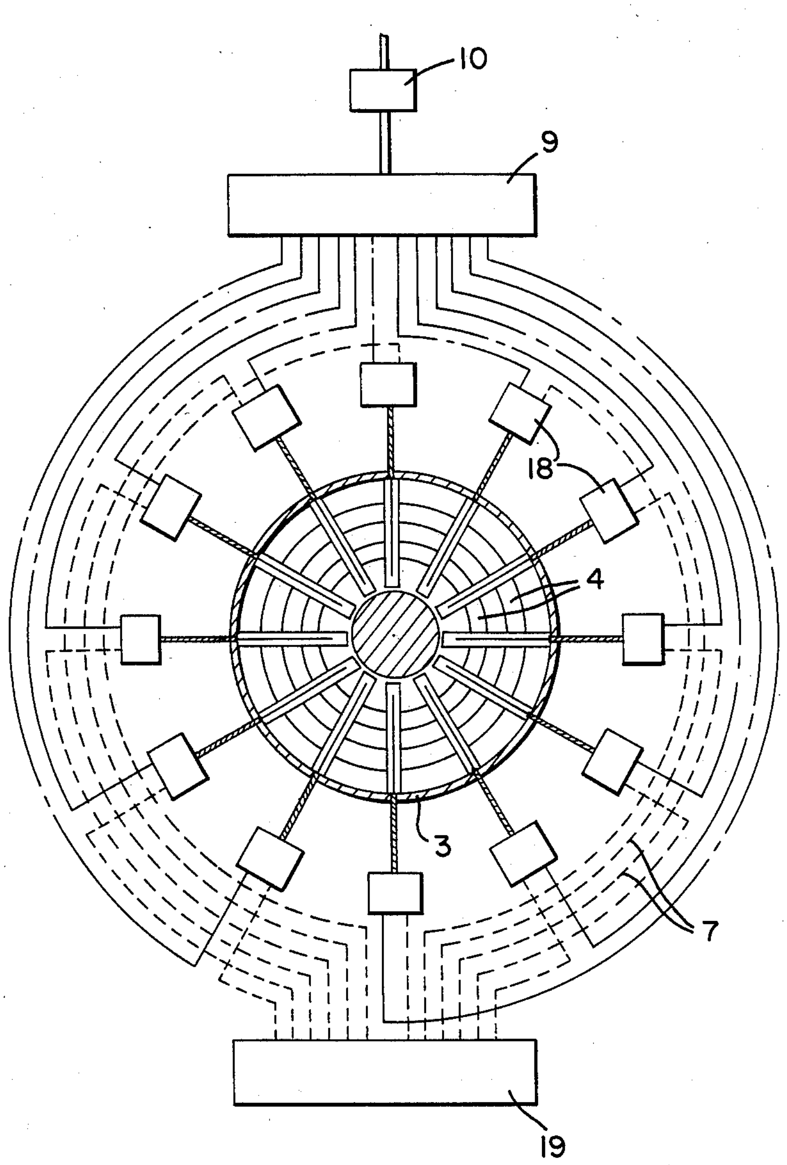
FIG. 7 is a schematic diagram of the fuel supply and purge air circuits connected to the individual fuel injector according to the invention.

In a first embodiment of the invention, as best seen in FIG. 3, each tubular fuel injector comprises a tubular portion 5 which passes through the exhaust pipe wall 3 and to which it is affixed by known means. The tubular portion 5 defines an internal conduit 6 which communicates with the fuel supply circuit 7 such that pressurized fuel passes through the conduit 6. The fuel is supplied through pump 9 and regulator 10, as shown in FIG. 7. fuel pumps and regulators are well known in the art and any such known pump and regulator may be utilized in conjunction with the present invention.

The radially innermost end of each fuel injector 8 is constricted so as to form a calibrated nozzle 11 which sprays fuel into atomizing chamber 12 which is rigidly joined to the end of the injector tubular portion 5. In this embodiment, the atomizing chamber is defined by a substantially cylindrical wall 13 which is welded to the end of the tubular portion 5. An end wall of the atomizing chamber 12, which is aligned with and spaced from the end of tubular portion 5 defining nozzle 11, defines a generally spherical indentation 14 onto which the pressurized fuel is projected through the nozzle 11.

Wall 13 defines a large diameter intake orifice 16 facing in an upstream direction. The direction of exhaust gas flow is indicated by arrow 15 in FIG. 3. Wall 13 also defines smaller diameter exit orifices 17 facing in the downstream direction. The orifices 16 allow a portion of the exhaust gases to flow into the atomizing chamber so as to atomize the fuel emananting from nozzle 11. The fuel is first sprayed against spherical indentation 14 so as to partially atomize the fuel and further atomization is caused by the impact of the intake exhaust gases passing through intake orifices 16. The atomized fuel/gas mixture exits through exit orifices 17 in the downstream direction and is subsequently ignited by known means, such as a spark plug, or by self-ignition when the exhaust gases have a sufficiently high temperature.

The number of intake orifices 16 and their sizes are such that the ratio of the number of exit orifices with respect to the number of intake orifices is between 5 and 8 inclusive with respect to constant size. This creates a larger air turbulence which, in turn, enhances the atomization of the fuel.

Figure 2:
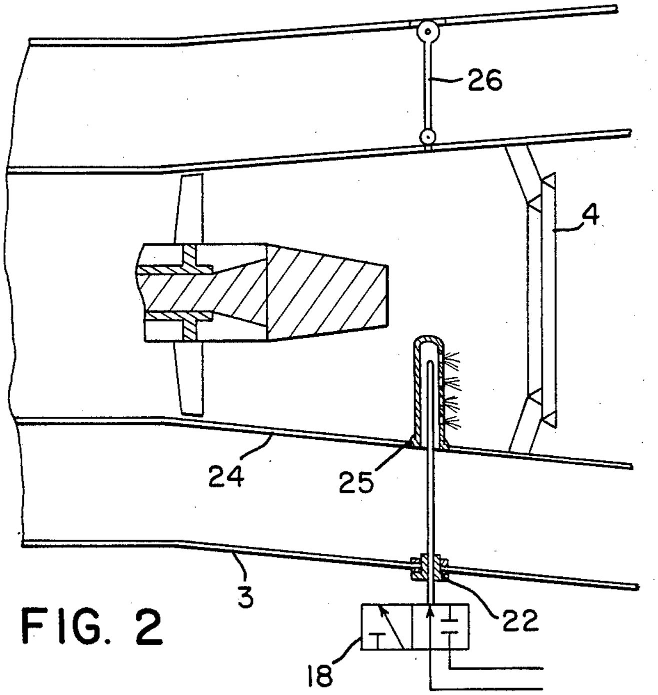
FIG. 2 is a partial, longitudinal section schematic view showing the afterburner injection system according to the invention incorporated in a ducted fan turbojet engine.

Each of the individual fuel injectors 8 is independently connected to the fuel supply circuit. This reduces the fuel dwell time in each injector and thereby reduces the danger of clogging the fuel mixture discharge orifices and the fuel outlet nozzle 11 due to coking. To further reduce this danger, each fuel injector is also individually connected to a purge box. A switching valve 18 is interposed between each fuel injector 8 and its respective connection to the fuel supply source and the purge box. Switching valve 18 allows the fuel injector conduit 6 to be connected to a compressed air source having a temperature lower than that of the exhaust gases, so as to expel into the exhaust gas stream all of the fuel in the fuel injectors, thereby preventing any coke deposition on the nozzles 11 and the exit orifices 17. Switching valve 18 may take the form of a slide valve, as shown in FIGS. 1 and 2, and may be controlled by any known means, such as by regulator 10.

The cold air source 19 shown in FIG. 7, may comprise air tapped from the turbojet engine fan or a low pressure compressor stage. The temperature drop caused by the purge air in the injector conduit 6 may be on the order of 50° from the moment the fuel feed stops to thereby avoid coking.

Figure 4:
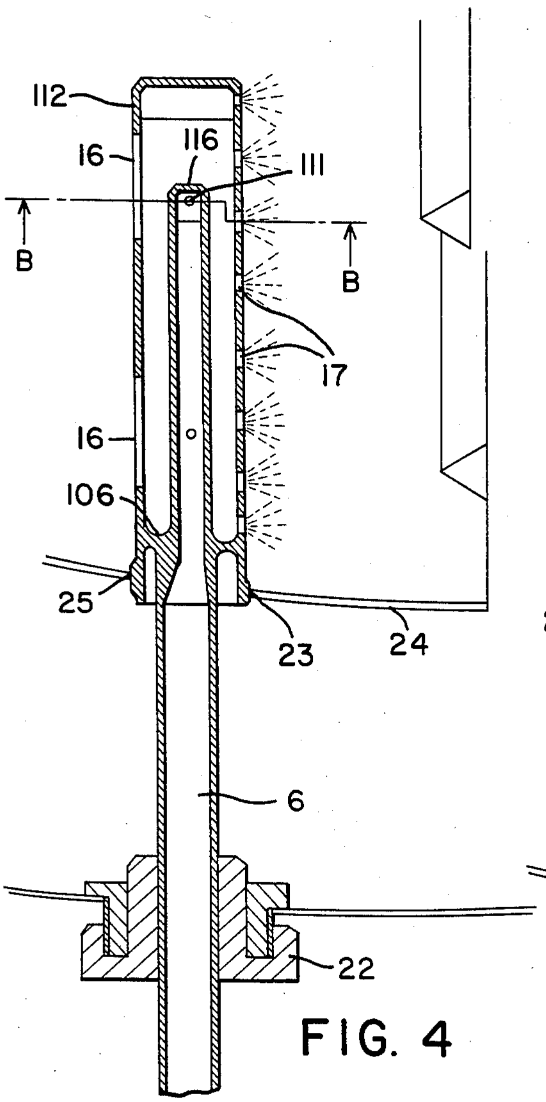
FIG. 4 is a cross-sectional view of the tubular fuel injector and an atomizing chamber according to a second embodiment of the invention.
Figure 6:
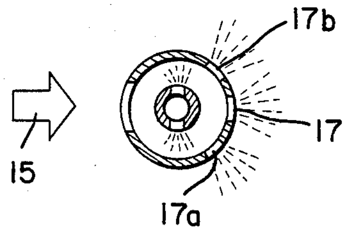
FIG. 6 is a cross-sectional view taken along line B—B in FIGS. 4 and 5.

A second embodiment of the construction of the fuel injectors is shown in FIG. 4. In this embodiment, the injector tube conduit 6 is closed at its radially innermost end 116 and its sidewalls define two sets of diametrically opposite fuel discharge nozzles 111. Cylindrical sleeve 112 defines the atomizing chamber and is welded to conduit 6 by collar 106. In this embodiment the cylindrical sleeve 112 defines two intake orifices 16 which also face in the upstream direction as in the previous embodiment, and a plurality of rows 17, 17a and 17b (see FIG. 6) of exit orifices which generally in the downstream direction. As shown in FIG. 6, the exhaust gases flow in the direction of arrow 15. The central row 17 of the exit orifices is diametrically opposite the intake orifices 16 such that their axes are substantially parallel to each other and are also parallel to the direction of the flow indicated by arrow 15. Adjacent rows of exit orifices 17a and 17b are located on either side of the plane containing the axes of orifices 16 and 17 such that their axes define an angle of between 30° and 50° relative to this plane. This orientation achieves the widest and most homogeneous fuel distribution in the exhaust gas flow.

Figure 5:
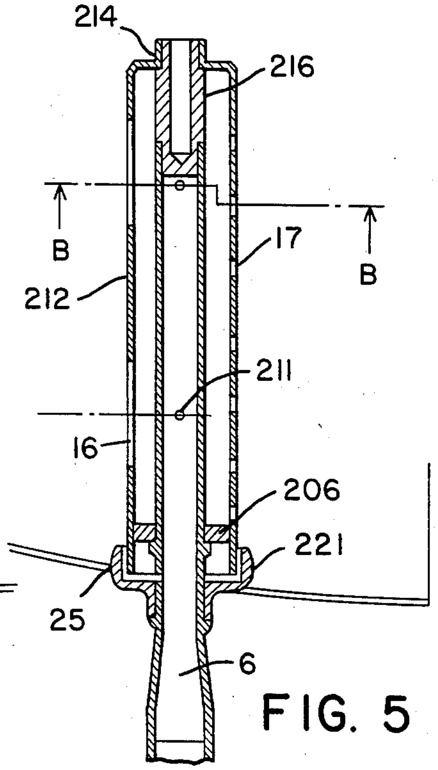
FIG. 5 is a longitudinal, sectional cross-section of the fuel injector and atomizing chamber according to a third embodiment of the invention.

A constructional variation of the second embodiment is shown in FIG. 5. In this version, cylindrical sleeve 212 is attached to cross member 216 by sleeve support 214. Cross member 216 is attached to and seals the radially innermost end of fuel injector conduit 6. The radially outermost end portion of the cylindrical sleeve 212 is centered on cross member 206 and is affixed to cup 221 which is rigidly attached to injector conduit 6.

As in the first embodiment, the embodiments shown in FIGS. 4 and 5 are also designed such that each fuel injector is independently connected to a fuel pump 9 and a purge box 18, and the flow is controlled by a valve similar to control valve 18.

The fuel injectors according to the present invention are directly fastened to the outer wall 3 of the afterburner by any known means. When the present fuel injectors are utilized in a turbojet engine of the ducted fan type, wherein the primary gas passage takes place through the afterburner and a secondary air passage takes place through an annular passage defined between the wall of the afterburner and an outer wall housing, the fuel injector tube is attached to this outer wall such that the injector conduits 6 passes completely through the secondary air passage and into the afterburner. As shown in FIGS. 2 and 4, the fuel injector passes through an aperture 23 in the wall 24 defining the outer limits of the afterburner. The injector conduit 6 also passes through outer wall 3 which defines the outer limits of the secondary air passage. Secondary air passes through the annular passage formed between walls 24 and 3. The cylindrical sleeve defining the atomizing chamber may be provided with a spherical bead 25 bearing against the periphery of aperture 23 to allow slight movement between the outer wall 24 and the fuel injector to compensate for any thermal expansion or contraction between these elements. A threaded collar 22 serves to attach the injector conduit 6 to the outer wall 3 in known fashion.

To limit the play between the injectors and the wall 24, each of the injectors is located in a plane of a brace 26 which serves to connect the wall 24 to the wall 3 in known fashion.

The association of one atomizing chamber with each fuel injector facilitates the atomization of the fuel by first splashing the fuel against an obstacle (spherical indentation 14 or the inside wall of cylindrical sleeves 112 or 212) and then subsequently further atomizing the fuel by contacting it with a portion of the exhaust gas flow passing through the intake orifices. By placing approximately twelve such fuel injector structures in a regular array disposed about the periphery of the afterburner, an extremely homogeneous dilution of the fuel is obtained. This design thereby achieves more effective homogenization of the fuel than the presently used manifold structures, while at the same time simplifying the design of the afterburner system. It also serves to simplity the maintenance of the afterburner and reduces the problems of waste caused by the manifolds of the prior art systems.

The combination of individual injectors and the purge boxes associated with each one increases the service life of the units and reduces the dangers of pollution from the injectors presently utilized.

The foregoing description is provided for illustrative purposes only and should not be construed as in any way limiting this invention, the scope of which is defined solely by the appended claims.

What is claimed is:

1. In a gas turbine engine having at least one turbine wheel, an afterburner and a flame holder located in the afterburner such that exhaust gases pass through the turbine wheel into the afterburner from an upstream direction toward a downstream direction generally parallel to a longitudinal axis of the turbojet engine, the improved system for injecting fuel into the exhaust gas stream in the afterburner comprising:

(a) a plurality of individual tubular injectors regularly distributed about the periphery of the afterburner and extending into the afterburner generally perpendicularly to the flow of gases therethrough;

(b) fuel supply means to supply fuel to each of the tubular injectors independently of the other tubular injectors;

(c) atomizing chamber means, one atomizing chamber associated with each tubular injector each atomizing chamber means defining at least one intake orifice to allow exhaust gas to pass into the chamber, and further defining a plurality of exit orifices, such that (i) the number of exit orifices is greater than the number of intake orifices, and (ii) the size of each exit orifice is smaller then the size of the at least one intake orifice; and, (d) nozzle means associated with each tubular injector to spray fuel into the associated atomizing chamber so as to create a finely atomized fuel mixture which passes through the exit orifices into the afterburner.

2. The improved system according to claim 1 wherein the at least one intake orifice is defined by the atomizing chamber means so as to face in the upstream direction and wherein the at least one exit orifice faces in a downstream direction.

3. The improved system according to claim 2 wherein a radially innermost end of the individual tubular injector defines the nozzle means and wherein the atomizing chamber means further comprises a wall spaced from and aligned with the nozzle means, the wall defining a generally spherical, concave indentation to cause splattering of the fuel impinging thereon from the nozzle means to assist in the atomization of the fuel.

4. The improved system according to claim 2 wherein the atomizing chamber means comprises a cylindrical sleeve disposed about the individual tubular injectors, the cylindrical sleeve defining at least one intake orifice and at least one exit orifice, the orifices having axes extending substantially parallel to each other and substantially parallel to the direction of gas flow through the afterburner; and wherein each tubular injector defines at least two nozzle means within the cylindrical sleeve, the nozzle means having axes extending generally perpendicular to a plane containing the axes of the intake and exit orifices.

5. The improved system according to claim 4 wherein the cylindrical sleeve defines a pair of intake orifices and three rows of exit orifices, a first row of exit orifices having axes extending substantially parallel to the axes of the intake orifices, the second and third rows of exit orifices having axes extending at an angle of between 30° and 50° with respect to a plane containing the axes of the first row of exit orifices.

6. The improved system according to claim 4 wherein the cylindrical sleeve defines a pair of intake orifices and three rows of exit orifices, a first row of exit orifices having axes extending substantially parallel to the axes of the intake orifices, the second and third rows of exit orifices having axes extending at an angle of between 30° and 50° with respect to a plane containing the axes of the first row of exit orifices.

7. The improved system according to claim 1 further comprising:

(a) air supply means associated with each tubular injector to supply purging air to the fuel circuit;

(b) a control valve interposed between the air supply means and each tubular injector to control the flow of purging air to each tubular injector; and, (c) means to actuate each control valve so as to simultaneously purge all of the tubular injectors.

8. The improved system according to claim 1 further comprising:

(a) an outer wall concentrically disposed about the afterburner so as to define a secondary air passage therebetween;

(b) a plurality of fastening braces extending generally radially between the outer wall and the afterburner; and, (c) means to attach individual tubular injectors to the outer wall such that each is diametrically opposite a fastening brace and such that the atomizing chamber means is disposed entirely within the afterburner.

* * * * *

UNITED STATES PATENT AND TRADEMARK OFFICE
CERTIFICATE OF CORRECTION

PATENT NO. : 4,730,453

DATED : March 15, 1988

INVENTOR(S) : BENOIST ET AL

It is certified that error appears in the above—identified patent and that said Letters Patent is hereby corrected as shown below:

Col. 1, line 58 - please delete "manufacturer" and substitute therefor --manufacture--.

Col. 3, line 21 - please delete "axis" and substitute therefor --axes--.

Col. 4, line 4 - please delete "fuel" and substitute therefor --Fuel--.

Col. 4, line 24 - please delete "emananting" and substitute therefor --emanating--.

Col. 6, lines 5-6 - please delete "simplity" and substitute therefor --simplify--.

Signed and Sealed this

Nineteenth Day of July, 1988

*Attest:*

DONALD J. QUIGG

*Attesting Officer*

*Commissioner of Patents and Trademarks*